(12) United States Patent
Luo et al.

(10) Patent No.: US 7,417,356 B2
(45) Date of Patent: Aug. 26, 2008

(54) POWER CONVERSION CIRCUITRY

(75) Inventors: Nie Luo, Urbana, IL (US); George Miley, Champaign, IL (US)

(73) Assignee: NPL Associates, Champaign, IL (US)

( * ) Notice: Subject to any disclaimer, the term of this patent is extended or adjusted under 35 U.S.C. 154(b) by 272 days.

(21) Appl. No.: 11/312,251

(22) Filed: Dec. 20, 2005

(65) Prior Publication Data

US 2006/0131886 A1 Jun. 22, 2006

Related U.S. Application Data

(60) Provisional application No. 60/638,023, filed on Dec. 20, 2004.

(51) Int. Cl.
*G21H 1/00* (2006.01)
*G21H 1/02* (2006.01)

(52) U.S. Cl. .................. 310/301; 310/305; 320/117; 320/118; 320/166; 976/DIG. 410; 976/DIG. 411

(58) Field of Classification Search ......... 310/300–302, 310/305; 320/117, 118, 124, 166; 976/DIG. 410, 976/DIG. 411, DIG. 416, DIG. 417; 376/320, 376/321; 307/108
See application file for complete search history.

(56) References Cited

U.S. PATENT DOCUMENTS

| | | | | |
|---|---|---|---|---|
| 2,119,588 A | * | 6/1938 | Lindenblad | 307/108 |
| 2,221,573 A | * | 11/1940 | Bruckmann | 307/108 |
| 3,005,942 A | * | 10/1961 | Perdreaux, Jr. et al. | 320/166 |
| 3,845,322 A | * | 10/1974 | Aslin | 307/108 |
| 3,931,564 A | * | 1/1976 | Mims | 363/71 |
| 4,175,249 A | * | 11/1979 | Gruber | 323/271 |
| 4,900,947 A | * | 2/1990 | Weiner et al. | 307/110 |
| 5,235,232 A | * | 8/1993 | Conley et al. | 310/303 |
| 6,350,944 B1 | * | 2/2002 | Sherif et al. | 136/244 |
| 6,583,522 B1 | * | 6/2003 | McNulty et al. | 307/71 |
| 6,624,535 B2 | * | 9/2003 | Morrow | 307/71 |

* cited by examiner

*Primary Examiner*—Burton Mullins
(74) *Attorney, Agent, or Firm*—Krieg DeVault LLP; L. Scott Paynter

(57) ABSTRACT

One form of the invention is directed to an apparatus that comprises step-down circuitry to better match impedance between an input and an output that includes a number of stages each electrically coupled to another and each including a charge storage device. The circuitry further includes a number of switching devices operable in a first electrical connectivity state to connect the charge storage device of each of the stages in series to receive electrical charge from the input and in a second electrical connectivity state opposite the first state to connect the charge storage device of each of the stages in parallel to discharge electricity through the output. This circuitry can be used in connection with a radioisotopic conversion cell.

25 Claims, 4 Drawing Sheets

POWER CONVERSION CIRCUITRY

CROSS-REFERENCE TO RELATED APPLICATIONS

The present application claims the benefit of U.S. Provisional Patent Application No. 60/638,023 filed on 20 Dec. 2004. U.S. Provisional Patent Application No. 60/638,023 is hereby incorporated by reference in its entirety.

BACKGROUND

The present invention relates to electric power devices, and more particularly, but not exclusively, relates to circuitry to provide electric power from radioactive decay and/or other nuclear processes. One nonlimiting embodiment of the present invention is directed to a radioisotope-based battery; however, in other embodiments different applications are envisioned.

Radioisotopic power sources have been used for space exploration for over 40 years, and have played major roles in high profile space missions such as the Apollo Lunar landing and the Cassini-Huygens mission exploring Saturn and Titan. Typically radioisotopic nuclear power is used in two forms: radioisotope thermoelectric generators (RTG) and radioisotope heater units (RHU). Both of these applications involve the conversion of nuclear radiation energy first into heat, which typically results in low conversion efficiency if the thermal energy is ultimately intended to be converted into electricity. Specifically, efficiency is limited by the Carnot cycle limit, among other things.

Such limits can be extremely severe for a space-based power system because a high-quality heat-sink is difficult to provide in spacecraft. Under such circumstances, generally the best approach is a large surface-area space radiator for which the heat ejection capacity is constrained by the black body radiation limit. Further compounding the problem is the low Z coefficient of available thermoelectric materials. As a result a typical space-based RTG operates at a very low efficiency of about five percent (~5%).

The situation is little better for thermionic converters. Under certain conditions, thermionic conversion can achieve about ten percent (~10%) efficiency. Unfortunately, such circumstances usually are degraded in space, which results in lower performance. As reported for the Russian TOPAZ-II, about 5.2% efficiency was obtained with this type of device. See, G.L. Kulcinski, "History of Soviet Topaz Reactors", http://fti.neep.wisc.edu/neep602/SPRING00/lecture35.pdf.

Radioisotope power systems continue to be used in space, such as the Jupiter Icy Moons Orbiter (JIMO) mission. To approach conversion efficiency greater than the thermal-based systems, new techniques are needed. Some attempts to address this need include dynamic (DIPS) systems such as Sterling engines and alkaline metal thermal (AMTEC) converters. U.S. Pat. No. 3,931,564 is directed to yet another type of radioisotope energy converter. However, each of these attempts faces various developmental issues that have yet to be resolved. As a result, further contributions to this area of technology are desired.

SUMMARY

One embodiment of the present application is a unique technique to provide electric power. Other embodiments include unique systems, devices, methods, and apparatus to provide electricity from radioisotope decay and/or other nuclear processes. Further forms, objects, features, aspects, benefits, advantages, and embodiments of the present invention shall become apparent from the detailed description and drawings provided herewith.

DESCRIPTION OF REPRESENTATIVE EMBODIMENTS

Figure 1:
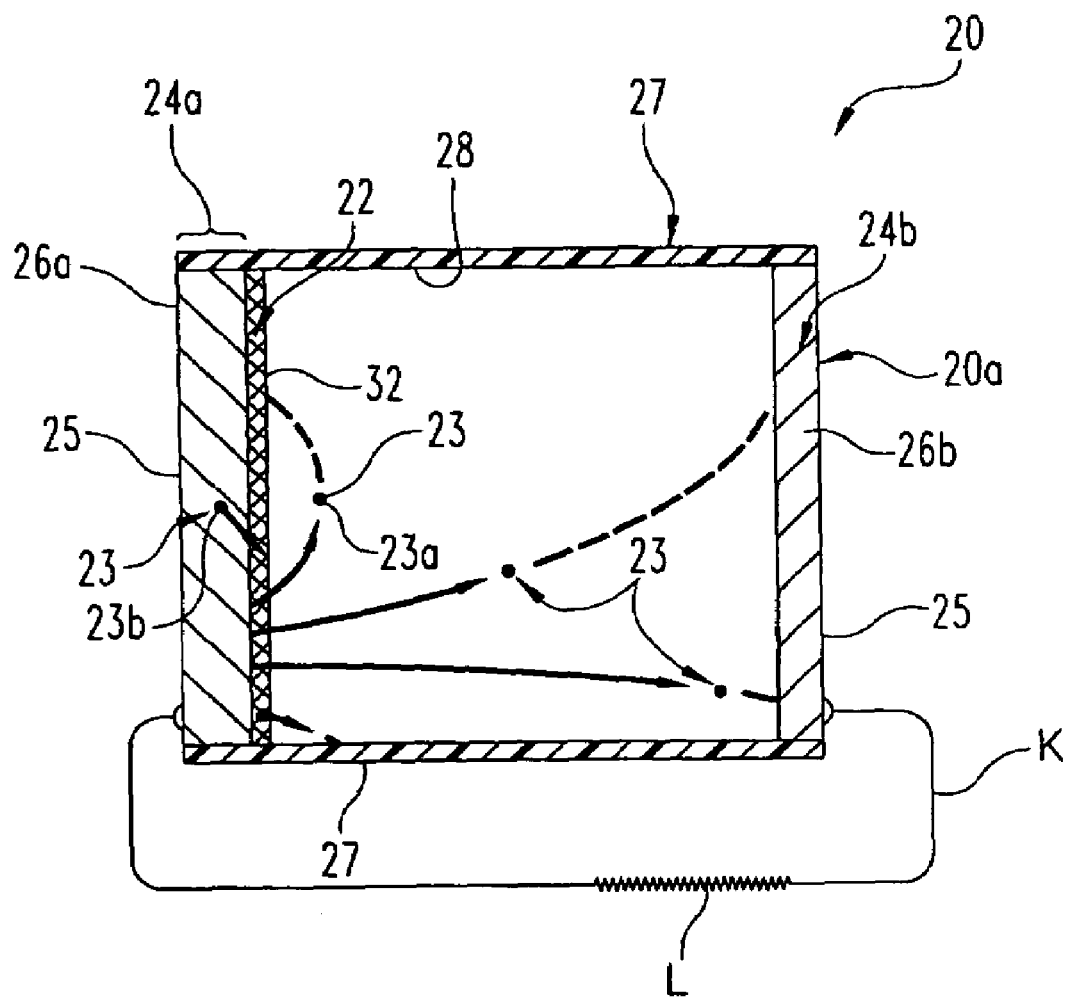
FIG. 1 is a schematic view of a radioisotopic conversion cell.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

In one embodiment, a conversion device 20 is utilized of the type illustrated in FIG. 1, and is based on a radioisotope source 22 of an Alpha and/or Beta emitter type. Device 20 is also designated conversion cell 20a. In FIG. 1, a few representative emitted particles are labeled by reference numeral 23. Is should be understood that many more particles 23 are present in a typical application than the number specifically depicted in FIG. 1.

In cell 20a, direct-energy conversion results from slowing down the energetic particles 23 against a DC electric field that is built-up between the electrodes 24a and 24b (shown in the form of plates 25) of a vacuum capacitor (or parallel plate vacuum diode) and therefore converts kinetic energy in to electrostatic potential energy. The charged particles 23, originating from the electrode 24a (also designated emitter 26a), are directly collected on the electrode 24b (also designated collector 26b) to form an electrical current and completing the illustrated circuit K with a resistive load L as shown in FIG. 1. High resistance electrically insulating wall structure 27 extends between plates 25 to define a chamber 28.

Conversion cell device 20 operates as a self-charging capacitor 30. The two electrodes 24a and 24b of the conversion cell device 20 are electrically insulated from one another by structure 27. At least a partial vacuum is formed between the electrodes 24a and 24b in the chamber 28 to facilitate the transport of high-energy charged particles 23 to collector 26b from source 22 of emitter 26a, and withstand the high voltage built-up across the plates 25. Further background pertaining to this type of device can be found in G. H. Miley, "Direct Conversion of Nuclear Radiation Energy," American Nuclear Society, 1970.

As depicted, source 22 is more specifically in the form of a radioactive fuel layer 32. Typically, it is desired that the fuel layer 32 be relatively thin to increase the chances that particles 23 emitted by the radioactive material will escape into the conversion cell chamber 28. This thickness is usually on the order of a hundred microns for Beta particles with energy around a few hundred keV (kilo-electron Volts). Fuel layer 32 is applied to the conductive plate 25 of electrode 24a, which is structured to provide adequate mechanical support for layer 32. Plates 25 are typically metallic, and are provided for mechanical strength and electrical conduction. An electrical load L could be directly inserted between the two electrodes 24a and 24b. As charged particles 23 reach the collector 26b, an electric potential builds-up. As this build-up occurs, subsequent particles 23 leaving the emitter have to overcome the potential barrier to reach the collector 26b. The basic energy-conversion is therefore from kinetic to potential energy.

If the conversion cell device 20 is of a parallel-plate type with forward radiation emission only, the overall conversion efficiency is given by equation (1) as follows:

$$\eta \propto V/V_{avg} \qquad (1)$$

where V is the operating voltage and $V_{avg}$ is the voltage equivalent of the average particle energy. Therefore the operating cell voltage directly determines the conversion efficiency. For a Beta-voltaic battery, $V_{avg}$ is set very high, on order of 100-1000 kV, to obtain conversion efficiencies >50%. The current density of the device 20, on the other hand, is extremely small, often on the order of sub-micro-Ampere (0.05 $\mu A/cm^2$ for strontium 90 ($^{90}Sr$)). As a result, a direct converter is characterized as a high voltage, high impedance device. This high impedance makes the practical use of such a power source difficult despite the efficiency gain that is possible.

Using electrostatic direct conversion with a beta or alpha emitting radioisotope under these conditions could achieve ~50% in efficiency, even accounting for losses due to the angular distribution of the radiation, energy spread, and slowing down in the emitter layer. These losses are represented by particle 23 that is also labeled by reference numeral 23a and in FIG. 1. The particle 23 also labeled with reference numeral 23b represents the particles 23 that are stopped in the plate 25 for emitter 26a. Generally, cell 20a can present a high voltage that may be several hundred kilovolts with a relatively low current level on the order of less than a microampere ($\mu A$). Correspondingly, the conversion cell device 20 presents a relatively high electrical impedance.

Figure 2:
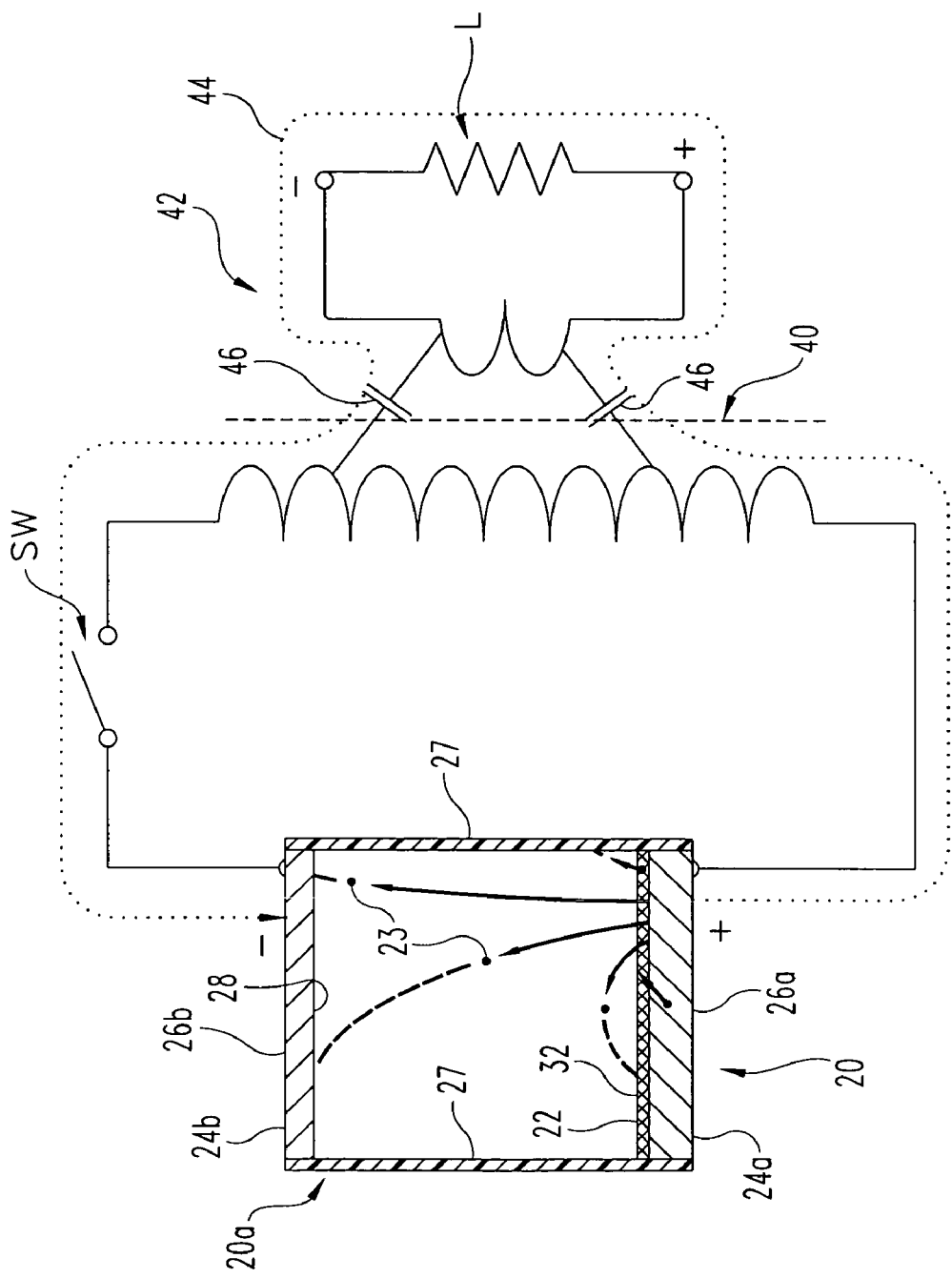
FIG. 2 is a schematic view of a conversion cell system.

Such electrical properties are generally undesirable for powering standard electronic devices—such as those based on integrated circuitry. Accordingly, circuitry to convert the electric power provided by such a cell is frequently of interest. While down-conversion (or voltage step-down) can be considered in terms of a typical coil transformer 40 directly connected to the conversion cell device 20 as shown in FIG. 2 (where like reference numerals refer to like features previously described), this approach is generally not attractive because magnetic flux-linked coil transformers 40 suitable for the conversion cell device output parameters tend to have an undesirable degree of parasitic capacitance—even with an air core. The parasitic capacitance of a coil transformer 40 and the corresponding equivalent circuit 42 are also illustrated in FIG. 2. For this equivalent circuit model, once the switch SW in FIG. 2 is closed, the discharge will proceed through the path indicated by the dashed curve 44—such that the discharge current will leak through the parasitic capacitance 46 of the transformer 40, reaching the load resistor R directly. Because the load typically has low impedance/reactance/resistance of a few ohms, (while the internal impedance of the conversion cell is usually>$10^{12}$ ohms), the working voltage of the conversion cell will be undesirably low usually corresponding to an unacceptably low conversion efficiency (see equation (1)).

Figure 3:
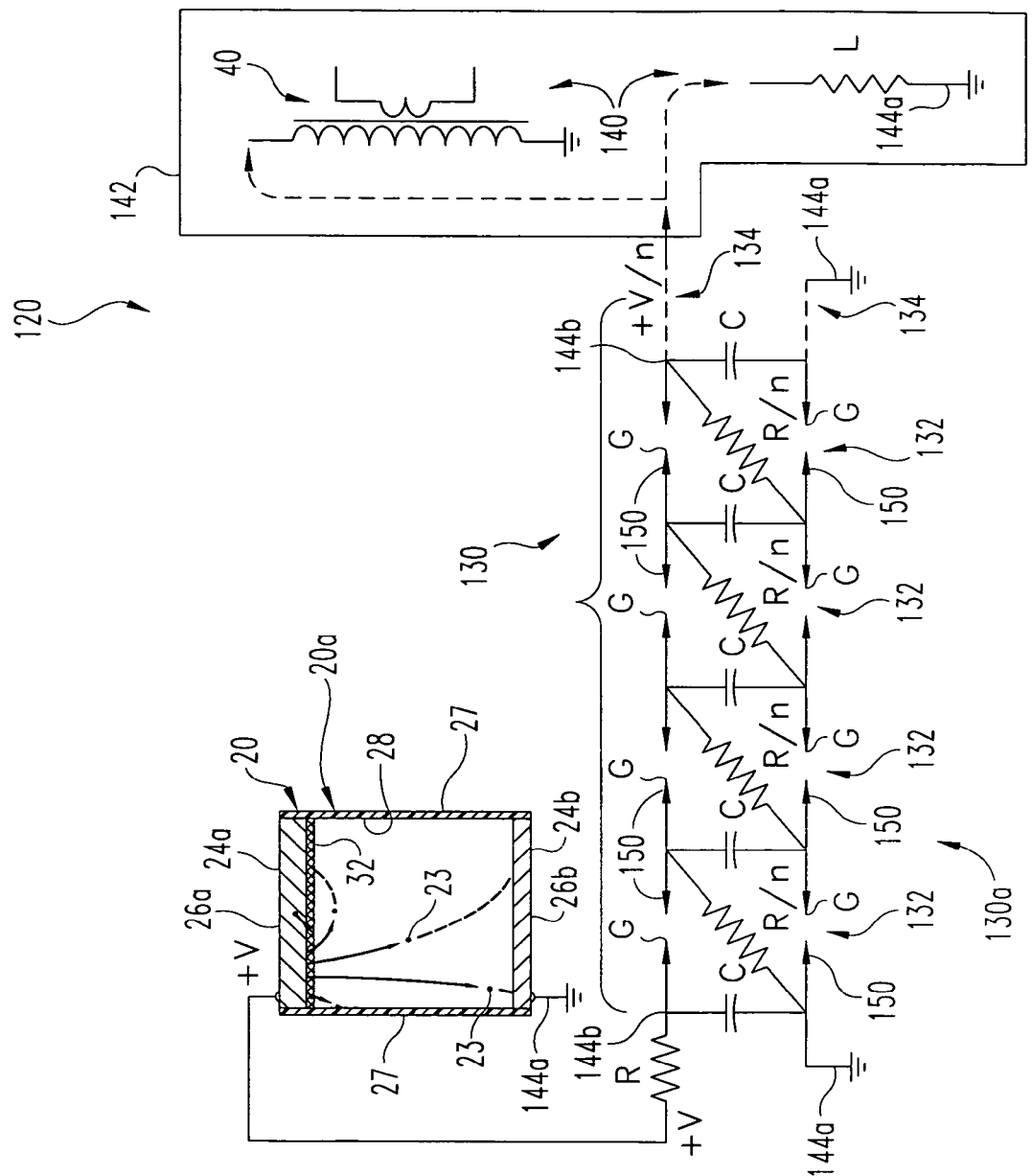
FIG. 3 is a schematic view of another conversion cell system.

For embodiments where greater efficiency is desired, innovative step-down circuitry reduces impedance during capacitor discharge to a load, transformer coil, or the like. Generally, this down-converter circuitry operates the capacitors in parallel during discharge. FIG. 3 schematically illustrates system 120 with down-converter circuitry 130, where like reference numerals refer to like features previously described. Down-converter circuitry 130 is also equivalently designated step-down circuitry 130a. FIG. 3 shows one particular, nonlimiting embodiment of circuitry 130 that includes "n" number of circuitry stages 132, where n is an integer. For stages 132, the respective capacitors C of circuitry 130 are charged from the conversion cell device 20 in series and discharged in parallel. More specifically the radioisotope conversion cell 20a operates at +V, which is typically a few 100 kV to a few MV (Mega-Volts). This voltage is applied to the down-converter circuitry 130 at the left of FIG. 3 to charge the capacitors C in each of the stages 132. This charge path generally follows a zig-zag pattern in FIG. 3 from left to right through alternating capacitors C and resistors R/n of each stage 132 while the illustrated spark gaps G are in an electrically open state. In other words, electric current flows from the input to the output of the circuitry through this series of components without dividing into other electrical circuit branches. Accordingly, for this configuration, electric current flows through a single electrical branch with capacitors C alternating in electrical series with resistors R/n. The dashed lines in circuitry 130 on the right hand side of FIG. 3 designated generally by reference numeral 134 represent additional stages 132 repeating the same pattern as the illustrated stages 132 that are not shown to preserve clarity.

For a typical conversion cell 20a, its internal capacitance is on the order of some 10 pico-Farad. Therefore the working voltage that can be maintained on the vacuum radioisotope conversion cell 20a is far less than nominal, which reduces efficiency proportionally. With the addition of the multistage down conversion circuitry 130, the effective capacitance of the conversion cell 20a can be increased as presented to the output circuitry 140, such as an external load L, transformer 40, or the like. Circuitry 140 constitutes at least a portion of output receiving device 142 depicted in FIG. 3. In one preferred arrangement, the total number of stages 132 in the down conversion circuitry 130 (i.e., capacitive voltage down-converter) is in a range from 100 through 1000 ($100 \leq n \leq 1000$) for a representative setup. In another preferred arrangement, at least 100 stages are utilized. In an even more preferred arrangement at least 1000 stages are utilized. Nonetheless, in other arrangements, stage quantity can differ.

In operation, as the radioisotope conversion cell device 20 charges the capacitors C alternating in series with the resistors R/n, the initial voltage across each of the down converter capacitors C is rather low—being below a threshold needed to initiate the indicated spark gaps G. The voltage +V from the radioisotope cell device 20 continues charging the n capacitors C, in series, through an effective resistance of 2R. After a time interval determined by a time constant $\tau=2RC/n$, the capacitors C are charged up to a voltage that exceeds the threshold for breakdown of air between the spark gaps G—usually on the order of a few kV. Once a first spark-gap G breaks down (arcover), it will trigger the break-down of neighboring spark-gaps G in an avalanche fashion—short-circuiting the upper and lower leads of the capacitors C of each stage 132, respectively.

As a consequence, the spark gaps G switch from the electrically open state of the charging configuration to an electrically closed state opposite the open state. In correspondence, the capacitors C effectively operate in a parallel configuration at the time of spark-gap G breakdown and discharge stored energy to the output receiving device 142. In other words, the capacitors each operate as a different branch of the circuitry 130 during discharge, with one terminal of each capacitor C being connected together at a common ground node 144a and the other terminal of each capacitor C being connected together at another electrical node 144b at output voltage (+V/n) relative to the ground node 144a. It should be appreciated that at this time of discharging configuration, the parallel operation of the down-converter capacitors C present an internal impedance to the output circuitry that is reduced by a factor of the integer number n. Through this approach, load matching to the down conversion circuitry 130 is more readily and efficiently accomplished—specifically it can increase the effective capacitance of the radioisotope conversion cell output by 10000-fold with a 100-stage down conversion circuit. Correspondingly, the parasitic capacitance of the transformer 40 plays a relatively small role and the working voltage of the conversion cell 20a is altered less relative to other approaches. This results in highly efficient conversion, according to $$\eta \propto V/V_{avg}.$$

For typical radioisotope conversion cell devices 20, the impedance mismatch for the source and load L can be over 10 orders of magnitude. Matching with a conventional coil transformer 40 is typically limited to a difference of about 4 orders of magnitude. For a 10 orders of magnitude mismatch, the remaining mismatch after accounting for a transformer is about 6 orders of magnitude. This 6 orders of magnitude mismatch can generally be accommodated by the multistage down conversion circuitry 130 of FIG. 3 using about 1000 stages. The capacitive reactance of the down-converter circuitry 130 is generally less likely to result in unintended oscillation that sometimes results when a conversion cell 20a is more directly connected to an inductive coil, such as in a transformer.

As an alternative or addition to spark-gap switching, other switching device types can be used to switch capacitors C of the down-converter circuitry 130 between serial charging and parallel discharging operational modes. By way of nonlimiting example, a solid-state switch type could be used, such as those based on a transistor, solid-state relay, SCR, Triac, or the like. Accordingly, spark-gaps G are each more generally designated as a switching device 150 in FIG. 3; however, some may not be labeled by reference numerals to preserve clarity.

Further, it should be appreciated that the resistors shown in the down conversion circuitry could be absent in other embodiments or each be substituted with a network including two or more resistor components, could partially or completely represent equivalent resistance of the capacitors, a combination of these, or represent another circuit arrangement as would occur to one skilled in the art. Also, in one or more stages 132 of the circuitry 130 the illustrated capacitor C could be provided in the form of two or more capacitor components and/or equivalents thereto. In still other embodiments, capacitors C could be partially or completely replaced with other types of charge storage device types. In yet other embodiments, charge storage devices or components (such as capacitors ), resistors, spark gaps (or other switching devices), and/or electrical interconnections can be defined using standard semiconductor manufacturing techniques, such as photolithography, sputtering, vacuum deposition, chemical/plasma/laser etching, screen printing, micromachining and the like.

The radioactive source or sources for the emitter of the conversion cell could be any that would occur to those skilled in the art. In one embodiment, a combination, $^{90}Sr/^{90}Y$, is utilized, although a different composition could be utilized in other embodiments including one or a combination of different radioisotopes. Of the ~1,300 radioisotopes available, many are fission products from reactors, and others can be manufactured in particle accelerators or in nuclear reactors. In one arrangement, a half life range of 100 days to 100 years is desired (100 days<$T_{1/2}$<100 years). Based on currently known isotopes with a half life in this range that also have a minimum power per mass, P', of P'>0.1 [Watt(th)/gm] and lack gamma ray emissions, the number of known isotopes reduces to about 30. Of these 15 that may be particularly desirable for a typical application are provided in Table I as follows:

TABLE I

Properties of isotopes useful for power generation.

| Isotope | Radiation emissions | Half-life (years) | Specific Power [Watts/gm] | Melting (° C.) |
|---|---|---|---|---|
| $_1$Tritium$^3$ | β⁻, no γ, bremstrahlung. | 12.33 | 0.26 | |
| $_{27}$Cobalt$^{60}$ | β⁻, γ, bremstrahlung | 5.27 | 17.7 | |
| $_{36}$Krypton$^{85}$ | β⁻, γ, bremstrahlung | 10.72 | 0.623 | |
| $_{38}$Strontium$^{90}$ | β⁻, no γ, bremstrahlung. | 29.0000 | 0.93 | 770.0 |
| $_{44}$Ruthenium$^{106}$ | β⁻, no γ, bremstrahlung | 1.008 | 33.1 | |
| $_{55}$Cesium$^{137}$ | β⁻, few γ, bremstrahlung. | 30.1700 | 0.42 | 28.0 |
| $_{58}$Cerium$^{144}$ | β⁻, many γ, bremstrahlung. | 0.7800 | 25.60 | 800.0 |
| $_{61}$Promethium$^{147}$ | β⁻, few γ, bremstrahlung. | 2.6234 | 0.33 | 1,300.0 |
| $_{69}$Thulium$^{170}$ | β⁻, few γ, bremstrahlung. | 0.353 | 13.2 | |
| $_{84}$Polonium$^{210}$ | α | 0.3800 | 141.00 | 254.0 |
| $_{94}$Plutonium$^{238}$ | α | 87.7400 | 0.56 | 640.0 |
| $_{94}$Plutonium$^{241}$ | α | 14.7 | | 640.0 |
| $_{95}$Americium$^{241}$ | α | 432 | 0.11 | |
| $_{96}$Curium$^{242}$ | α | 0.4500 | 120.00 | 950.0 |
| $_{96}$Curium$^{244}$ | α | 18.1100 | 2.84 | 950.0 |

$^{90}$Sr is an example of a beta emitter that does not also emit gamma rays, which is generally more attractive in terms of safety and corresponding device design in certain applications. Nonetheless, as beta particles encounter the surrounding material, secondary radiation in the form of bremstrahlung radiation can result. While additional shielding to block bremstrahlung radiation may then be desired, this secondary form of radiation generally impacts the device design less than gamma emitting isotopes. Nonetheless, in other embodiments safety shielding is not used or not otherwise desired, and such embodiments may use $^{90}$Sr and/or one or more other radioisotopes of which any may or may not emit gamma rays.

The isotope $^{90}$Sr as a pure beta emitter (without gamma ray emission), makes it attractive for radioisotopic power generation. Its half-life is 29 years and its average beta energy per disintegration is about 0.21 MeV (Mega-electron-Volt). It decays into $^{90}$Y, which has a half life of 64 hours and average beta particle energy per disintegration of 0.89 MeV. The two isotopes are in secular equilibrium or have generally the same activity. The $^{90}$Y isotope decays into stable $^{90}$Zr. The total specific activity in Becquerels per gram of a mixture of $^{90}$Sr in secular equilibrium with its $^{90}$Y daughter nuclide is 0.93 [Watts(th)/gm]. For a 1 thermal Watt generator, about 1.1 gm of the mixture is needed. This is compared with 0.56 Watt (th)/gm for $^{238}$Pu requiring a larger weight of 1.78 gms to produce 1 thermal Watt of power. Accordingly, the $^{90}$Sr selection provides a relative weight advantage for those applications where weight saving is desired—such as space applications.

In addition to shielding and emitter selection based on the type of radiation emitted, typical safety concerns also tend to favor a chemical form of the radioisotope that can be readily contained and that is not likely to migrate through a mishap, such as a fire or container rupture. By way of nonlimiting example, for a $^{90}$Sr based system, it can be provided in the form of strontium titanate: $SrTiO_2$—having a relatively high melting point of 1910° C., which is above temperatures typically reached in a fire. Strontium titanate also has a relatively low solubility in fresh or salt water, which favors isolation from living organisms should it be released into the environment. It is also resistant to shock and physically strong. Further, it should be appreciated that $^{90}$Sr is available at the megacuries level in the waste from uranium reprocessing. Accordingly, in certain embodiments, $^{90}$strontium titanate provides a desired emitter coating; however, it should be appreciated that other radioisotopes in various chemical forms could be utilized either with or without $^{90}$strontium titanate in other embodiments.

Figure 4A:
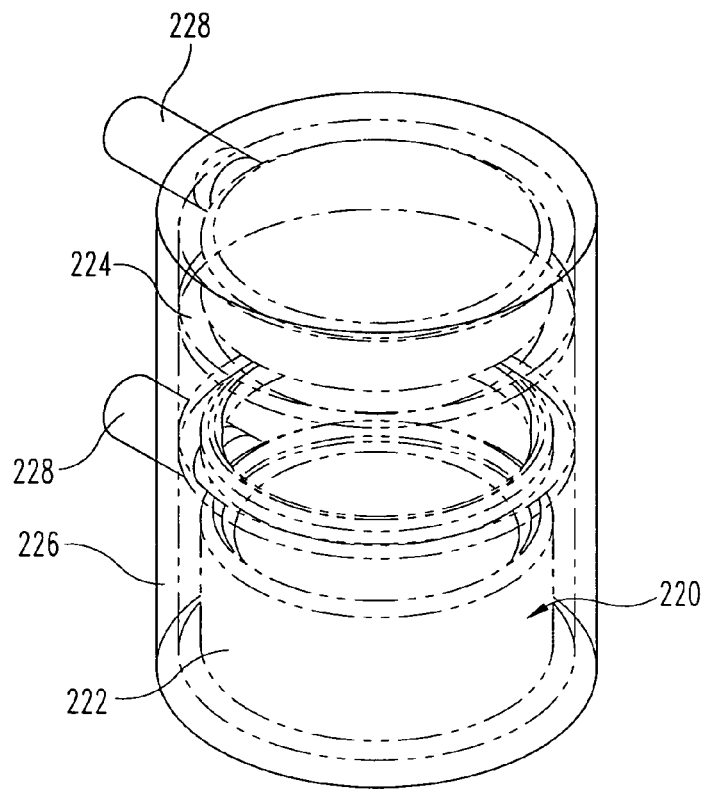
FIGS. 4A and 4B are exploded perspective and side views, respectively, of a nonlimiting experimental configuration of a conversion cell for the system of FIG. 3.
Figure 4B:
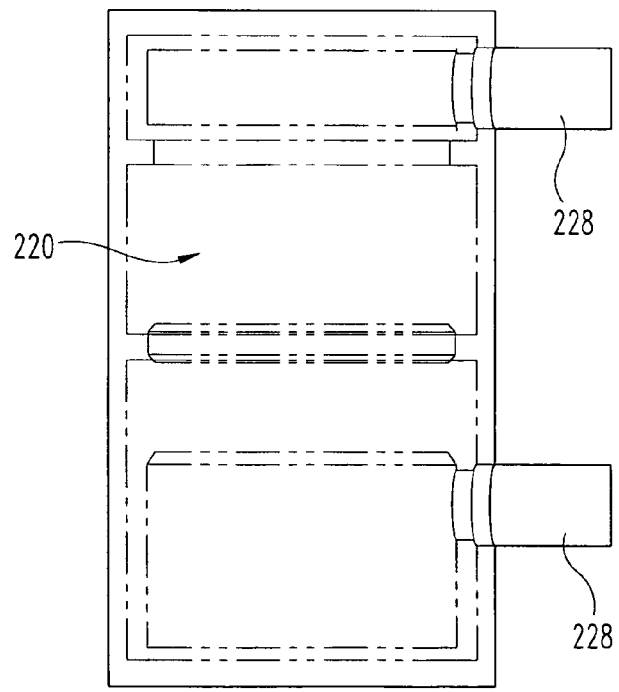

FIGS. 4A and 4B illustrate an experimental form of an integrated radioisotopic conversion cell 220 and down-converter for testing purposes. This experimental form includes a circular emitter-coated plate 222 and a circular collector plate 224 separated by a vacuum gap and housed in enclosure 226; where the emitter-coating includes $^{90}$strontium titanate. Emitter plate 222 and collector plate 224 provide corresponding electrodes 228 that can be electrically coupled to output equipment. The detailed structure and dimensions may be easily adjusted, as required. It should be appreciated that this experimental form facilitates flexible testing while not seeking to optimize design efficiency relative to emitter area/unit-volume or the like.

Many inventive embodiments and forms of the present application are envisioned. By way of nonlimiting example, one embodiment comprises: operating a conversion cell to generate electric charge from nuclear radiation; charging a number of charge storage devices electrically coupled in series with the electric charge generated by the conversion cell; changing an electrical configuration of the charge storage devices to discharge electricity while parallel to one another after the charging; and providing the electricity to a receiving device from the charge storage devices during the discharging. In one form, the nuclear radiation is provided in the form of a beta emission. In a particular variation of this form, the conversion cell includes $^{90}$Sr to provide the beta emission. In an even more particular form, the $^{90}$Sr is provided as $^{90}$strontium titanate.

In another example, an electric power source comprises one or more radioisotopic conversion cells to generate electric charge, output circuitry, and step-down circuitry with an input to receive the electric charge from the one or more radioisotopic conversion cells and an output to provide electricity to the output circuitry. The step-down circuitry operates to improve impedance matching between the one or more radioisotopic conversion cells and the output circuitry and includes a number of charge storage devices.

These charge storage devices are coupled together in series in a first configuration to charge the charge storage devices with the electric charge from the one or more radioisotopic conversion cells and are reconfigurable to a second configuration to couple the charge storage devices in parallel to discharge the electricity to the output circuitry.

This reconfiguration can be accomplished by meeting a threshold voltage that triggers conduction through corresponding spark gaps and/or different types of switching devices. The charge storage devices can each be a capacitor. In one form, at least one of the radioisotopic conversion cells includes a beta emitter. In a particular variation of this form, the beta emitter includes $^{90}$Sr. In an even more particular form, $^{90}$Sr is provided as $^{90}$strontium titanate.

Still another embodiment is directed to an apparatus that comprises step-down circuitry to better match impedance between an input and an output that includes a number of stages each electrically coupled to another and each including a charge storage device. The circuitry further includes a number of switching devices operable in a first electrical connectivity state to connect the charge storage device of each of the stages in series to receive electrical charge from the input and in a second electrical connectivity state opposite the first state to connect the charge storage device of each of the stages in parallel to discharge electricity through the output. The switching devices can be in the form of spark gaps, solid-state switches, or such different device type as would occur to one skilled in the art. Alternatively or additionally, the input can be coupled to one or more radioisotopic conversion cells to provide the electric charge to the input. In one form, at least one of the radioisotopic conversion cells includes a beta emitter. In a particular variation of this form, the beta emitter includes $^{90}$Sr. In an even more particular form, this $^{90}$Sr is provided as $^{90}$strontium titanate.

A further example includes: generating electric charge; providing the electric charge to an input of step-down circuitry that includes a number of charge storage devices and a number of switching devices; operating the circuitry in a charging configuration to receive the electric charge, the charging configuration including the switching devices in a first electrical connectivity state to connect the charge storage devices in series; and providing electricity through an output of the circuitry by operating the circuitry in a discharging configuration, the discharging configuration including the switching devices in a second electrical connectivity state opposite the first state to connect the charge storage devices in parallel. The switching devices can be in the form of spark gaps, solid-state switches, or such different device type as would occur to one skilled in the art. Alternatively or additionally, the input can be coupled to one or more radioisotopic conversion cells to generate the electric charge. In one form, at least one of the radioisotopic conversion cells includes a beta emitter. In a particular variation of this form, the beta emitter includes $^{90}$Sr. In an even more particular form, this $^{90}$Sr is provided as $^{90}$strontium titanate.

Any theory, mechanism of operation, proof, or finding stated herein is meant to further enhance understanding of the present invention and is not intended to make the present invention in any way dependent upon such theory, mechanism of operation, proof, or finding. While the invention has been illustrated and described in detail in the drawings and foregoing description, the same is to be considered as representative and not restrictive in character, it being understood that only the selected embodiments have been shown and described and that all changes, modifications, and equivalents of the inventions as defined herein or by the following claims are desired to be protected. All publications, patents, and patent applications cited in this specification are herein incorporated by reference as if each individual publication, patent, or patent application were specifically and individually indicated to be incorporated by reference and set forth in its entirety herein.

What is claimed is:

1. A method, comprising:
operating a conversion cell to generate electric charge from nuclear radiation;
charging a number of charge storage devices electrically coupled in series with the electric charge generated by the conversion cell;
changing an electrical configuration of the charge storage devices to discharge electricity while parallel to one another after the charging; and
providing the electricity to a receiving device from the charge storage devices during the discharging.

2. The method of claim 1, wherein the receiving device includes a transformer.

3. The method of claim 1, wherein the nuclear radiation is provided in the form of a beta emission.

4. The method of claim 3, wherein the conversion cell includes $^{90}$Sr to provide the beta emission.

5. The method of claim 4, which includes providing the $^{90}$Sr in the form of $^{90}$strontium titanate.

6. The method of claim 1, wherein the charge storage devices are each a capacitor.

7. The method of claim 6, wherein the charge storage devices are coupled together from one to the next by two spark gaps.

8. The method of claim 7, wherein each of the storage devices corresponds to a different one of at least 100 repeating circuitry stages.

9. An apparatus, comprising:
one or more radioisotopic conversion cells to generate electric charge;
circuitry with an input to receive the electric charge from the one or more radioisotopic conversion cells and an output to provide electricity, the circuitry including a number of charge storage devices electrically coupled together in series in a first configuration to charge the storage devices with the electric charge from the one or more radioisotopic conversion cells, the circuitry being structured to be reconfigurable to electrically couple the charge storage devices together in parallel in a second configuration to discharge the electricity through the output; and
wherein the circuitry includes a number of switching devices responsive to a threshold voltage to change between the first configuration and the second configuration.

10. The apparatus of claim 9, wherein the charge storage devices are each a capacitor and the switching devices are each a spark gap.

11. The apparatus of claim 10, wherein the charge storage devices and the switching devices are arranged as a number of repeating circuitry stages.

12. The apparatus of claim 11, wherein the stages number 100 or more.

13. The apparatus of claim 11, wherein the stages number at least 1000.

14. The apparatus of claim 9, wherein at least one of the radioisotopic conversion cells includes a beta emitter.

15. The apparatus of claim 14, wherein the beta emitter includes $^{90}$Sr.

16. A method, comprising:
generating electric charge;
providing the electric charge to an input of step-down circuitry that includes a number of charge storage devices and a number of switching devices;
operating the circuitry in a charging configuration to receive the electric charge, the charging configuration including the switching devices in a first electrical connectivity state to connect the charge storage devices in series; and
providing electricity through an output of the circuitry by operating the circuitry in a discharging configuration, the discharging configuration including the switching devices in a second electrical connectivity state opposite the first state to connect the charge storage devices in parallel.

17. The method of claim 16, wherein the switching devices each include a spark gap.

18. The method of claim 16, wherein the charge storage devices each include a capacitor.

19. The method of claim 16, wherein the switching devices each include a spark gap and the charge storage devices each include a capacitor.

20. The method of claim 19, wherein the switching devices and the charge storage device are arranged in several repeating stages.

21. The method of claim 20, wherein the stages number 100 or more.

22. The method of claim 20, wherein the stages number at least 1000.

23. The method of claim 16, wherein the generating of the electric charge is performed by with one or more radioisotopic conversion cells.

24. The method of claim 23, wherein at least one of the radioisotopic conversion cells includes a beta emitter.

25. The method of claim 24, wherein the beta emitter includes $^{90}$Sr.

* * * * *